United States Patent
Rastegar et al.

(10) Patent No.: US 9,112,390 B2
(45) Date of Patent: Aug. 18, 2015

(54) DYNAMO-TYPE LANYARD OPERATED EVENT DETECTION AND POWER GENERATORS

(71) Applicants: Jahangir S Rastegar, Stony Brook, NY (US); Richard T Murray, Patchogue, NY (US)

(72) Inventors: Jahangir S Rastegar, Stony Brook, NY (US); Richard T Murray, Patchogue, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 14/176,076

(22) Filed: Feb. 8, 2014

(65) Prior Publication Data

US 2014/0225376 A1    Aug. 14, 2014

Related U.S. Application Data

(60) Provisional application No. 61/762,938, filed on Feb. 10, 2013.

(51) Int. Cl.

| | |
|---|---|
| F02B 63/04 | (2006.01) |
| F02B 67/04 | (2006.01) |
| H02K 7/18 | (2006.01) |
| F42C 15/40 | (2006.01) |
| F42C 11/00 | (2006.01) |
| F03B 13/10 | (2006.01) |

(52) U.S. Cl.
CPC ............ H02K 7/1853 (2013.01); F42C 11/008 (2013.01); F42C 15/40 (2013.01)

(58) Field of Classification Search
USPC ................. 290/1 E, 42, 53; 482/115
See application file for complete search history.

(56) References Cited

U.S. PATENT DOCUMENTS

| | | | | |
|---|---|---|---|---|
| 4,057,904 | A * | 11/1977 | Vrabel et al. | 33/700 |
| 4,082,267 | A * | 4/1978 | Flavell | 482/6 |
| 4,124,182 | A * | 11/1978 | Loeb | 244/153 R |
| 4,228,360 | A * | 10/1980 | Navarro | 290/43 |
| 4,261,562 | A * | 4/1981 | Flavell | 482/6 |
| 4,678,184 | A * | 7/1987 | Neiger et al. | 482/4 |
| 4,767,227 | A * | 8/1988 | Mitsuishi et al. | 400/124.23 |
| 6,133,642 | A * | 10/2000 | Hutchinson | 290/1 A |
| 6,254,034 | B1 * | 7/2001 | Carpenter | 244/153 R |
| 6,349,808 | B1 * | 2/2002 | Bryant | 191/12.2 R |
| 6,555,931 | B2 * | 4/2003 | Mizzi | 290/54 |
| 6,598,824 | B2 * | 7/2003 | Schmidt | 242/603 |
| 6,664,759 | B1 * | 12/2003 | Goris | 320/107 |
| 6,924,571 | B2 * | 8/2005 | Bye | 310/75 A |
| 7,045,912 | B2 * | 5/2006 | Leijon et al. | 290/42 |
| 7,087,001 | B1 * | 8/2006 | Ihli | 482/115 |
| 7,319,278 | B2 * | 1/2008 | Gehring | 290/53 |
| 7,504,741 | B2 * | 3/2009 | Wrage et al. | 290/55 |
| 7,522,042 | B2 * | 4/2009 | Milo | 340/545.1 |
| 8,013,457 | B2 * | 9/2011 | Bulthaup et al. | 290/1 R |
| 8,093,731 | B2 * | 1/2012 | Bulthaup et al. | 290/1 R |
| 8,287,434 | B2 * | 10/2012 | Zavadsky et al. | 482/5 |

(Continued)

*Primary Examiner* — Pedro J Cuevas

(57) ABSTRACT

A generator including: a housing having an opening; a rotatable member having a slot formed for an angular length less than 360 degrees; a cable disposed in the slot and having a free end protruding from the opening in the housing; a cable stop disposed in a predetermined position in the slot; a spring for storing energy as the cable is unwound from the slot by pulling on the free end until the rotatable member rotates relative to the housing and the cable stop aligns with the opening; and an electromagnetic generator operatively connected to the spring such that the stored energy of the spring is transferred to an input side of the electromagnetic generator.

8 Claims, 15 Drawing Sheets

(56) References Cited

U.S. PATENT DOCUMENTS

| | | | |
|---|---|---|---|
| 8,556,783 B1 * | 10/2013 | Ihli et al. | 482/115 |
| 8,579,770 B2 * | 11/2013 | Smith | 482/110 |
| 8,845,499 B1 * | 9/2014 | Boatwright | 482/116 |
| 8,901,766 B2 * | 12/2014 | Werjefelt | 290/53 |
| 8,963,362 B2 * | 2/2015 | Sia | 290/55 |
| 8,994,198 B2 * | 3/2015 | Tsivicos | 290/1 R |
| 2002/0033019 A1 * | 3/2002 | Mizzi | 60/398 |
| 2003/0094535 A1 * | 5/2003 | Schmidt | 242/603 |
| 2005/0121915 A1 * | 6/2005 | Leijon et al. | 290/42 |
| 2006/0273594 A1 * | 12/2006 | Gehring | 290/42 |
| 2007/0164568 A1 * | 7/2007 | Greenspan et al. | 290/53 |
| 2008/0150378 A1 * | 6/2008 | Heinrich et al. | 310/78 |
| 2008/0150493 A1 * | 6/2008 | Bulthaup et al. | 322/1 |
| 2008/0157531 A1 * | 7/2008 | Bulthaup et al. | 290/50 |
| 2008/0157536 A1 * | 7/2008 | Bulthaup et al. | 290/1 R |
| 2008/0157615 A1 * | 7/2008 | Bulthaup et al. | 310/89 |
| 2008/0157635 A1 * | 7/2008 | Bulthaup et al. | 310/68 R |
| 2008/0157636 A1 * | 7/2008 | Bulthaup et al. | 310/75 B |
| 2008/0157637 A1 * | 7/2008 | Bulthaup et al. | 310/75 R |
| 2009/0036276 A1 * | 2/2009 | Loach | 482/72 |
| 2009/0322092 A1 * | 12/2009 | Werjefelt | 290/53 |
| 2011/0177923 A1 * | 7/2011 | Smith | 482/110 |
| 2011/0251021 A1 * | 10/2011 | Zavadsky et al. | 482/5 |
| 2013/0065680 A1 * | 3/2013 | Zavadsky et al. | 463/30 |
| 2014/0048643 A1 * | 2/2014 | Shusum | 242/562 |
| 2014/0060367 A1 * | 3/2014 | Rastegar et al. | 102/207 |
| 2014/0113779 A1 * | 4/2014 | Loach | 482/115 |

* cited by examiner

US 9,112,390 B2

DYNAMO-TYPE LANYARD OPERATED EVENT DETECTION AND POWER GENERATORS

CROSS-REFERENCE TO RELATED APPLICATIONS

This application claims benefit to U.S. Provisional Application No. 61/762,938 filed on Feb. 10, 2013, the entire contents of which is incorporated herein by reference. This application is related to U.S. patent application Ser. Nos. 13/297,234 filed on Nov. 15, 2011 and 13/797,938 filed on Mar. 13, 2013, the entire contents of each of which are incorporated herein by reference.

GOVERNMENT RIGHTS

This invention was made with Government support under contract FA8651-10-C-0145 awarded by the United States Air Force. The Government has certain rights in the invention.

BACKGROUND OF THE INVENTION

1. Field of the Invention

The present invention relates generally to small weapon systems, and more particularly, to methods for enabling safe/arm functionality within small weapons.

2. Prior Art

All weapon systems require fuzing systems for their safe and effective operation. A fuze or fuzing system is designed to provide, as a primary role, safety and arming functions to preclude munitions arming before the desired position or time, and to sense a target or respond to one or more prescribed conditions, such as elapsed time, pressure, or command, and initiate a train of fire or detonation in a munition.

Fuze safety systems consist of an aggregate of devices (e.g., environment sensors, timing components, command functioned devices, logic functions, plus the initiation or explosive train interrupter, if applicable) included in the fuze to prevent arming or functioning of the fuze until a valid launch environment has been sensed and the arming delay has been achieved.

Safety and arming devices are intended to function to prevent the fuzing system from arming until an acceptable set of conditions (generally at least two independent conditions) have been achieved.

A significant amount of effort has been expended to miniaturize military weapons to maximize their payload and their effectiveness and to support unmanned missions. The physical tasking of miniaturization efforts have been addressed to a great extent. However, the same cannot be said regarding ordnance technologies that support system functional capabilities, for example for the case for fuzing.

It is important to note that simple miniaturization of subsystems alone will not achieve the desired goal of effective fuzing for smaller weapons. This is particularly the case in regards to environmental sensing and the use of available stimuli in support of "safe" and "arm" functionality in fuzing of miniature weapon technologies.

A need therefore exists for the development of methods and devices that utilize available external stimuli and relevant detectable events for the design of innovative miniature "safe" and "arm" (S&A) mechanisms for fuzing of gravity dropped small weapons.

SUMMARY OF THE INVENTION

Accordingly, a generator is provided. The generator comprising: a housing having an opening; a rotatable member having a slot formed for an angular length less than 360 degrees; a cable disposed in the slot and having a free end protruding from the opening in the housing; a cable stop disposed in a predetermined position in the slot; a spring for storing energy as the cable is unwound from the slot by pulling on the free end until the rotatable member rotates relative to the housing and the cable stop aligns with the opening; and an electromagnetic generator operatively connected to the spring such that the stored energy of the spring is transferred to an input side of the electromagnetic generator.

The generator can further comprise an input gear connected to an end of the spring, such that the input gear rotates from the stored energy of the spring; and a generator gear operatively engaged with the electromagnetic generator and the input gear.

The generator can further comprise a flywheel operatively connected between the generator gear and the electromagnetic generator.

The generator can further comprise an idler gear engaged with the generator gear and partially engaged with the input gear such that the input gear loses engagement with the generator gear after a predetermined amount of revolution of the idler gear.

Also provided is a generator comprising: a housing having an opening; a rotatable member disposed in the housing; a release member having an end exposed through the opening and an other end selectively engaging the rotatable member; a spring having a pre-stored energy which is released to rotate the rotatable member upon disengagement of the other end with the rotatable member; and an electromagnetic generator operatively connected to the rotatable member such that the rotation of the rotatable member is transferred to an input side of the electromagnetic generator.

The generator can further comprise a shaft rotatable with the rotatable member.

The generator can further comprise a clutch having an input side connected to the shaft and an output side connected to the electromagnetic generator.

The generator can further comprise a flywheel connected between the clutch and the electromagnetic generator.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Dynamo-Type Event Detection and Power Generator Prototype

Figure 1:
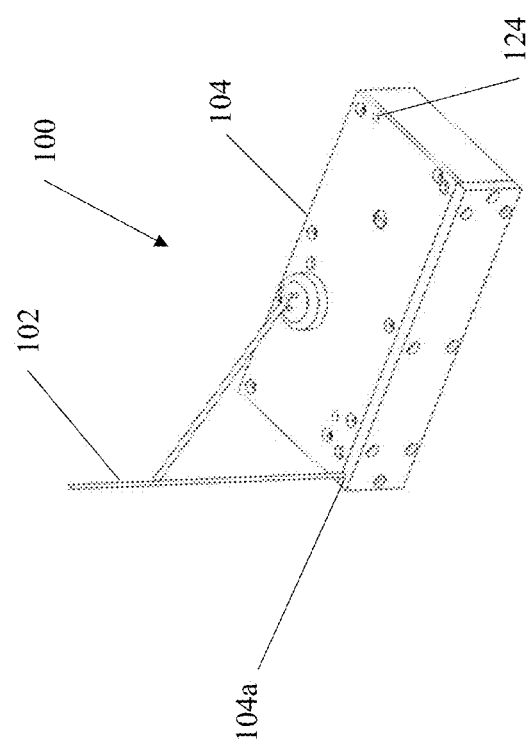
FIG. 1 illustrates a dynamo-type event-detection and power generator.
Figure 2:
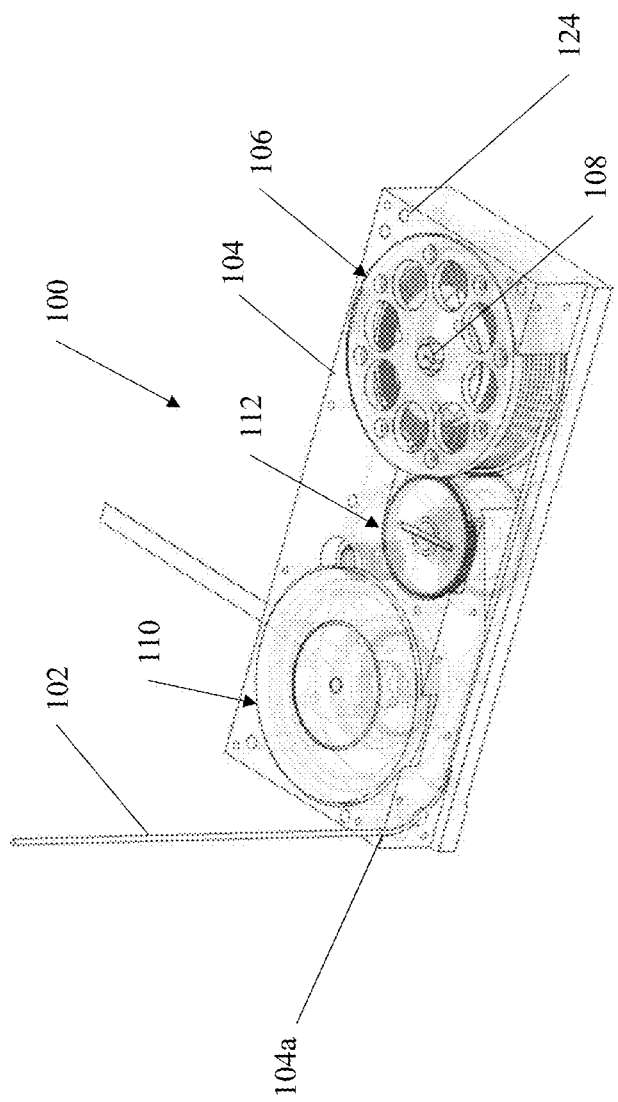
FIG. 2 illustrates internal components of the dynamo-type event-detection and power generator of FIG. 1.
Figure 3:
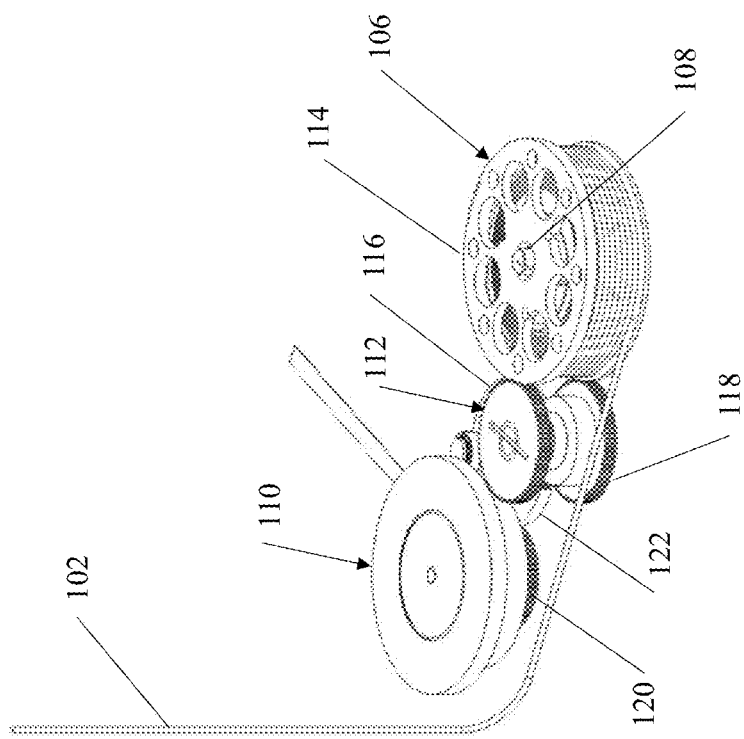
FIG. 3 illustrates a close-up view of three main sub-assemblies of the dynamo-type event-detection and power generator of FIG. 1.

An event-detection and power generator (alternatively referred to herein simply as "a generator") is shown in FIGS. 1-3 and is generally referred to by reference numeral 100. The event-detection and power generator 100 are assumed to fit within a predetermined volume. For example, as shown in FIG. 1, the event-detection and power generator 100 can fit within a space with a rectangular face area (to be attached to the weapon shell) of at most 2.5 inch wide and 6 inches long, and a thickness of between 0.75 to 1 inches. The overall dimensions of the device can be 2.5"×6"×1.0" and is expected to generate about 10 J of electrical energy with off-the-shelf components by the pulling of the lanyard 102, reaching an efficiency of over 40%. However, the event-detection and power generator can be optimized to either reduce its size or increase its power output, particularly by using slightly customized components, such as for its gearings and generator. The elongated member is referred to herein as "a lanyard" for that portion extending from a housing 104 of the generator 100 and as "a cable" for that portion disposed within the housing 104.

The generator 100 operates by extending the cable 102 from an interior of the housing and upward (e.g., in the direction opposite to gravity) by pulling of the lanyard 102 in the weapon assembly out of the top of the housing 104. The cable 102 is routed inside the generator housing 104 to rotate a cable drum 106 about its axis 108. Inside the cable drum 106, a generator spring (not shown) is fixed to the housing 104 at its inner diameter, and to the cable drum 104 at its outer diameter. There is no energy stored in the generator spring before the cable 102 is pulled. When the cable 102 is pulled (i.e., unwound from the drum), the generator spring is wound, storing mechanical potential energy. As the generator spring reaches its maximum energy storage, the cable's 102 anchor to the drum 106 is in a position of imminent release from the drum 106 such that continuing to pull on the cable 102 will release the cable 102 from the cable drum 106, allowing the generator spring to convert its mechanical potential energy into kinetic energy by rotating the cable drum 106, which in turn rotates an electrical generator 110 through a clutch assembly 112.

Once the cable 102 is released from the cable drum 106, the cable 102 is prevented from pulling out of the housing 104, such as by the cable termination end used to anchor the cable 102 to the cable drum 106 being larger than the cable diameter and smaller than at least one opening through which the cable 102 is routed through the housing such that the cable termination end will not pass through such routing passages in the housing 104. Additionally, the cable 102 is prevented from traveling back towards the cable drum 106, which would cause possible interference, by the presence of a friction shoe (not shown) near the opening 104a where the cable 102 exits the housing 104. This friction shoe also ensures that the cable 102 will remain properly wound on the cable drum 106 prior to the cable being pulled and operation of the generator 110 commences.

As can be seen in FIG. 3, a drum assembly gear 114 is engaged with a clutch assembly gear 116, while another gear 118 attached to an opposite side of the clutch 112 engages a generator gear 120 (directly or through intermediate gearing 122). Because of the constant engagement of the gears, rotation of the cable drum 106 turns the upper (input) gear 116 of the clutch assembly, during both loading and unloading of the generator spring. The clutch 112 is designed to only transmit torque to the lower (output) gear 118 of the clutch 112, and therefore to the electrical generator 110, when the generator spring is unwinding. While the generator spring is being wound (cable pulling), the clutch 112 transmits no torque to the electrical generator 110. After the cable 102 has been released from the cable drum 106, the torque generated by the unwinding of the generator spring is transmitted to the electrical generator 110, which, because of the clutch 112, is free to spin after the generator spring has unwound to its zero energy state, giving the electrical generator 110 increased time to convert the kinetic energy of the rotating clutch 112, generator gear 120, and generator rotor (not shown), into electrical energy.

Figure 4:
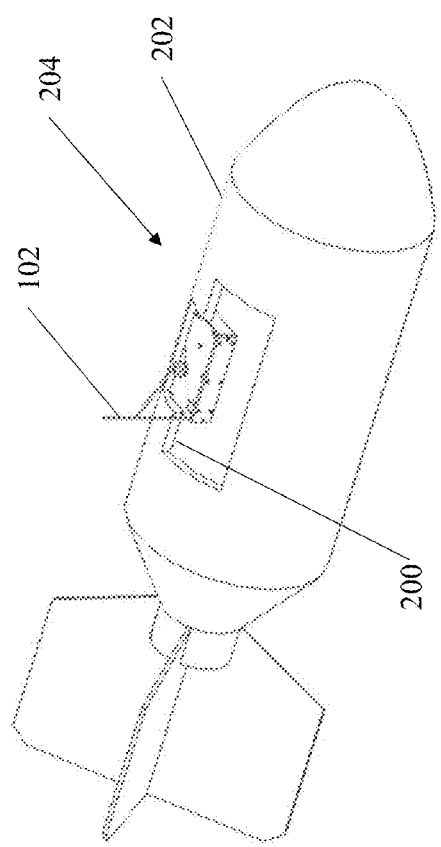
FIG. 4 illustrates a cut-away view showing the developed dynamo-type event-detection and power generator attachment to the inside surface of the weapon shell.

The dynamo-type event-detection and power generator 100 can be attached to the interior surface 200 of a weapon shell 202 as shown in the cutaway view of FIG. 4. The attachment can be with any type of fasteners, such as four screws through the mounting holes 124 provided in the generator body 104. The generator 100 would only require a very small hole in the weapon shell 202 to allow the cable/lanyard 102 to pass through. The view of the weapon of FIG. 4 from outside the weapon shell 202 is shown in FIG. 5.

Figure 5:
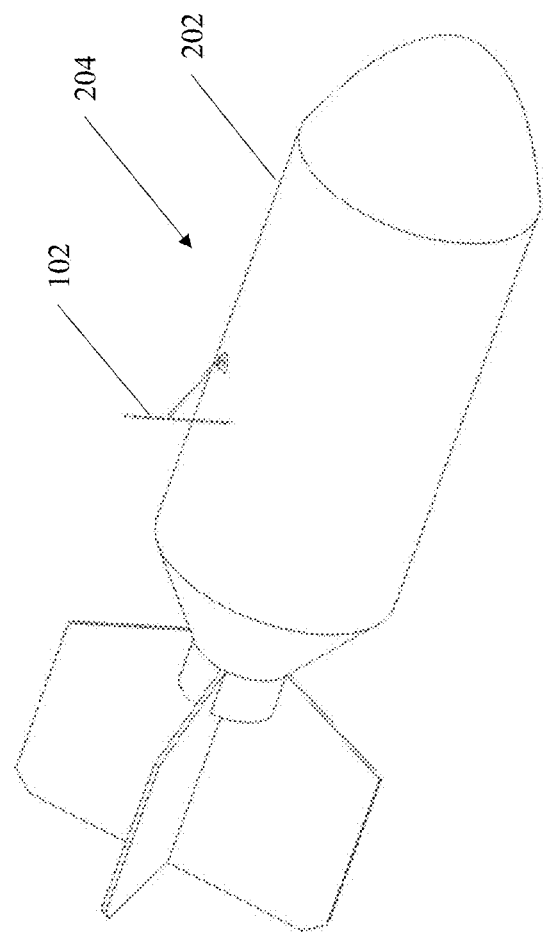
FIG. 5: The view of the developed dynamo-type event-detection and power generator from the weapon outside.

FIGS. 4 and 5 are illustrated with an optional multi-directional pitot tube (described below) to provide a means of differentiating accidental drop of the weapon 204 on the ground or weapon detachment without detaching the lanyard from air drop of the weapon.

Methods to Differentiate Air-Drops from Accidental Ground-Drops

Currently used deployable turbine generators have the capability of differentiating air-drops from accidental drops on the ground since when air-dropped, the air turbine begins to generate electrical energy while following an accidental ground dropping, the turbine generator is deployed but would not be generating any electrical energy. However, the lanyard operated event detection and power generation device 100 of FIG. 1, by itself, is incapable of differentiating accidental weapon release on land from an actual air drop.

Two methods are described for potential use for measuring air speed that can be used in event detection and power generation devices as well as for the purpose of differentiating weapon release from accidental drop. These two methods also have the advantage of potentially providing air speed information without being very sensitive to the direction of weapon descent.

Figure 6:
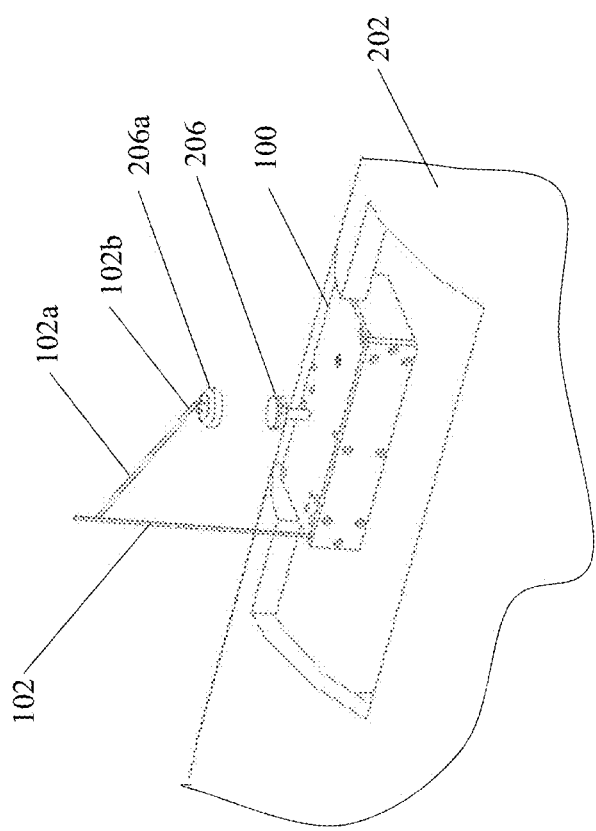
FIG. 6: Cut-away view showing the dynamo-type event-detection and power generator of FIG. 1 with a multi-directional pitot probe and a lanyard tethered cover.

In the first method, as shown in FIGS. 4-7, a second short cable 102a is attached to the lanyard 102 such that as it is pulled and activates the generator 100, the lanyard 102 would also pull on the second short cable 102a, thereby activating a relatively small Pitot-tube 206 (or a cluster of more than one relatively short Pitot-tubes that are oriented at different angles—e.g., at 120 degrees). The activation of the Pitot tube 206 can be by attaching an end 102b of the second short cable 102a to a cap 206a that covers the Pitot tube 206. Once pulled, the cap 206a would be removed from the Pitot tube, as shown in FIG. 6 and the Pitot-tube(s) 206 would then serve to measure air speed, thereby allowing the weapon safety circuitry to differentiate air-drops from accidental drops on the ground. The Pitot-tube(s) 206 can be relatively small (externally mounted) since it is not used for very accurate air-flow measurement.

When provided, a multi-directional Pitot tube may be routed from the generator unit to an outer surface of the weapon shell. Such a feature could augment the safe/arm characteristics by using physical aerodynamic effects in the logic of the safe/arm system. For example, a requirement that the Pitot tube sense a high air-speed before arming would prevent arming if the aircraft were not actually in-flight. As discussed above, the ports of the Pitot tube 206 may be fitted with a protective cap 206a, as shown in FIG. 6, which is attached to the end 102b of the second short cable 102a. Upon pulling the cable 102, the protective cap 206a of the Pitot tube 206 would be pulled off, exposing the ports of the Pitot tube 206 to the atmosphere. Such a cap 206a would serve two purposes: first, the cap 206a would guard against debris obscuring the Pitot tube 206; second, the cap 206a would act as a mechanical "turn-on" switch for the Pitot tube 206, only when uncovered by pulling the generator cable 102/102a would the Pitot tube 206 sense any velocity.

Figure 7:
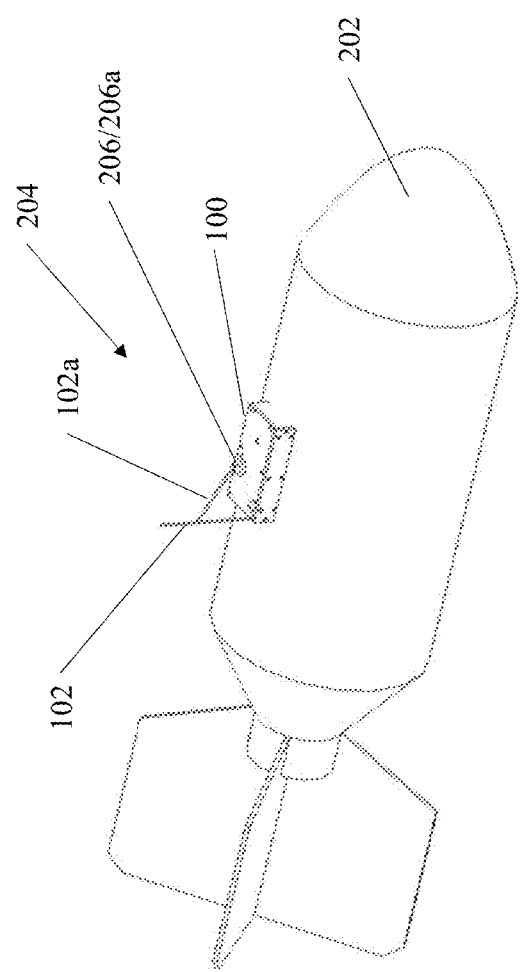
FIG. 7 illustrates an optional mounting configuration of the dynamo-type event detection and power generator of FIG. 1 on an outer surface of a weapon shell.

For weapon systems which cannot accommodate the generator 100 on the interior of the weapon shell 202, the generator 100 may be fixed to an exterior of the shell, as shown in FIG. 7. Naturally, the contour and dimensions of such a generator 100 would be altered to minimize the drag and avoid interference with adjacent hardware. Such a mounting of the generator 100 will only require a small hole in the weapon shell to pass any generator wires (providing electrical power) to inside the weapon 204. Alternatively, the generator power wires may be routed from the outside of the shell 202 to, e.g., the weapon fuzing. The deployed Pitot-tube 206 may also be utilized as an auxiliary descent velocity measurement device in such configuration.

Figure 8:
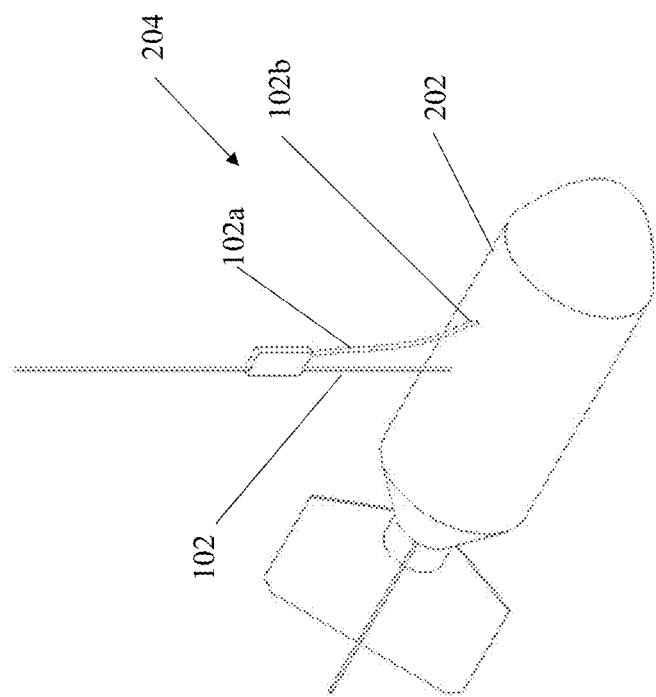
FIG. 8 illustrates a Bernoulli-effect detector opening that is exposed by the pulling of the lanyard (before the lanyard pull).
Figure 9B:
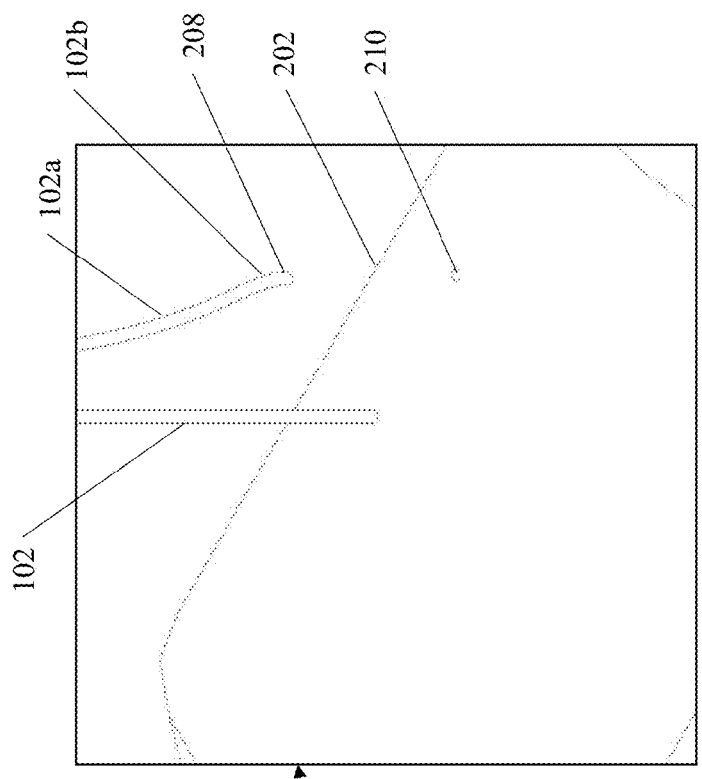
FIGS. 9a and 9b illustrate a Bernoulli-effect detector opening that is exposed by the pulling of the lanyard (after the lanyard pull).
Figure 9A:
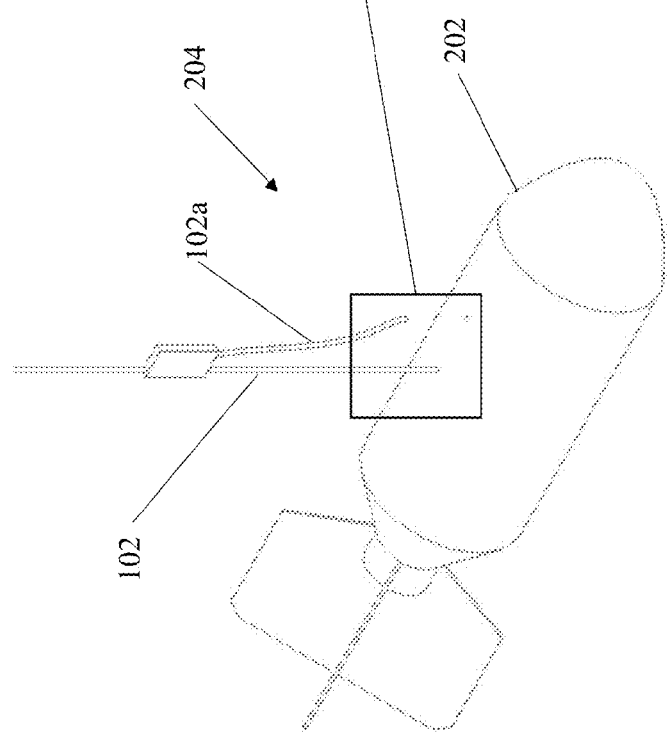

In the second method, referring now to FIGS. 8, 9a and 9b, the aforementioned short second cable 102a is similarly attached to the lanyard 102 such that as it is pulled and activates the generator 100, it would also pull the second short cable 102a, as shown in FIG. 8 (prior to lanyard pull). When pulled, the lanyard 102 actuates the generator 100 and the short second cable 102a removes a small plug 208 attached to the end 102b of the second short cable 102a, exposing a port 210 which can use a Bernoulli Effect to sense velocity, as shown in FIGS. 9a and 9b.

Figures 10A, 10B:
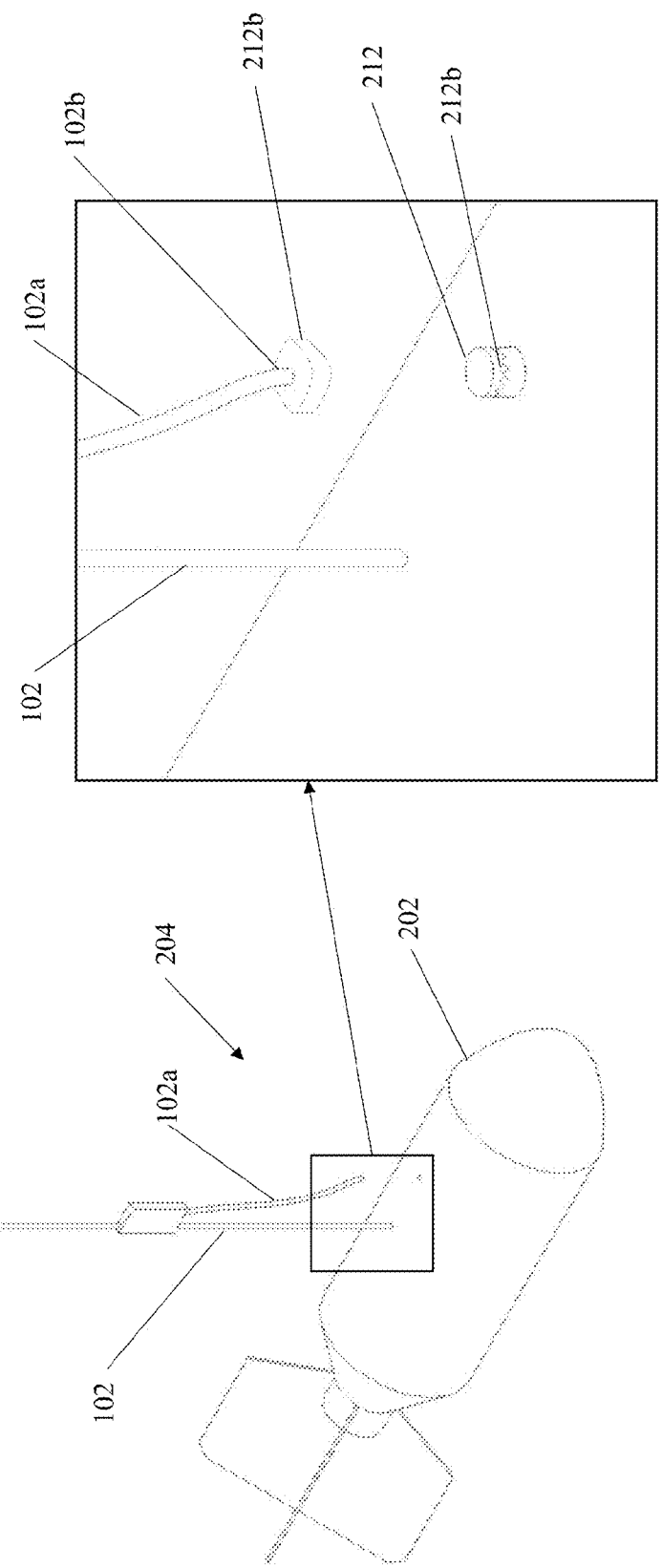
FIGS. 10a and 10b illustrate an "omni-directional" airstream velocity detector that is exposed by the pulling of a split lanyard.

In an alternative version, the above two concepts can be "combined" to provide an effectively "omni-directional" airstream velocity detector 212 shown in FIGS. 10a and 10b. In this concept, similar to the Bernoulli-type detector 210 of FIGS. 9a and 9b, the airstream detector 212 is covered by a cover 212a fixed to the end 102b of the short second cable 102a prior to release and the cover 212a is removed by the lanyard/second short cable 102/102a upon weapon 204 release from an airframe (not shown).

The "omni-directional" airstream velocity detector 212 has multi-sided inlets 212b that would allow it to operate in airstream with any flow direction. The detector 212 would in fact operate similar to a Pitot-tube (but obviously not as accurately as a Pitot-tube with a long neck), but can serve well enough for differentiating air drops from accidental ground drops. The detector 212 may also have a central through hole (not shown) to sense pressure drop due to Bernoulli effects.

Hybrid Dynamo-Turbine Type Event Detection and Power Generators

Referring now to FIGS. 11-15, there is described a device achieved by integrating a highly miniaturized version of the lanyard operated dynamo-type event detection device 300 with a turbine type release event detection and power generator (FZU) 302.

Such an integrated "hybrid" device has the advantages of both systems. The dynamo-type component of the device would provide the means to reliably detect release and provide fuzing power irrespective of the weapon drop altitude, i.e., even when the weapon is dropped from very high or very low altitude. The turbine component of the device would then serve as a power generation device and speed sensor during the flight when more power is required to be generated.

In one design, upon weapon deployment, the cable immediately provides an initial spin to the turbine dynamo before the turbine is capable of appreciable output. The system may be designed such that as the turbine begins spinning at the same time when the initial impetus provided by the cable is subsiding. The inclusion of a transmission/clutch in the device allows for the turbine to power the dynamo without the burden of continuing spinning the spool pulley and vice-versa. Such hybrid system has particular utility to provide reliable electrical power to the weapon throughout the duration of the weapon's flight.

Figure 11C:
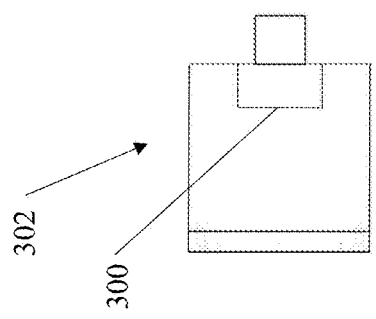
FIGS. 11a-11c illustrate an approximate size and position of a miniaturized dynamo-type event detection and power generator for a specific application.
Figure 11A:
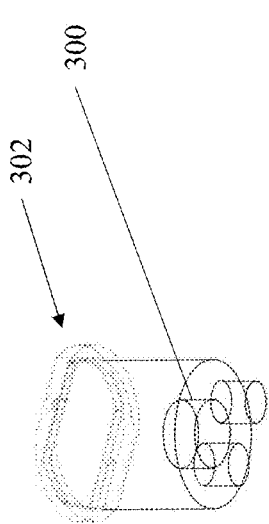
Figure 11B:
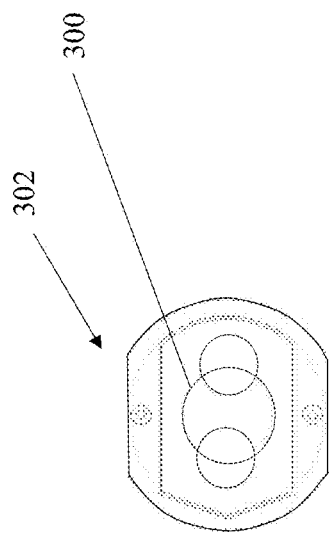

A size of the miniaturized dynamo-type event detection and power generator 300 can be such that it can be integrated into a FZU-63B (shown as reference numeral 302), as shown in the three views of FIGS. 11a-11c. In such configuration, the miniaturized dynamo-type event detection and power generators 300 are 22 mm in diameter and 12 mm in height.

Figure 12B:
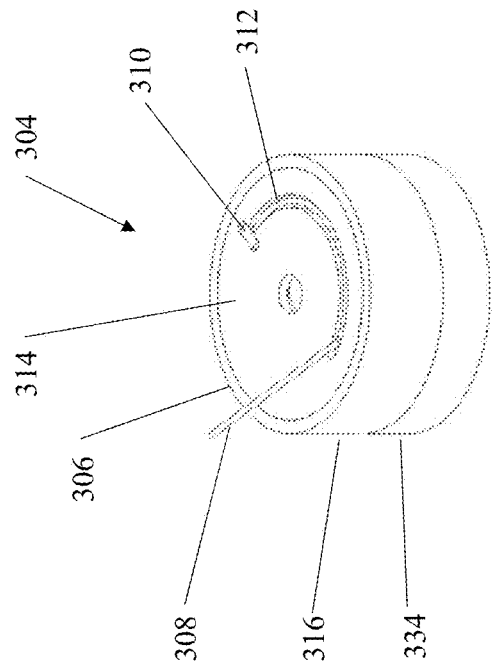
FIGS. 12a and 12b illustrate a cable-pull power spring wounding and release gear train with and without an outer housing, respectively.
Figure 12A:
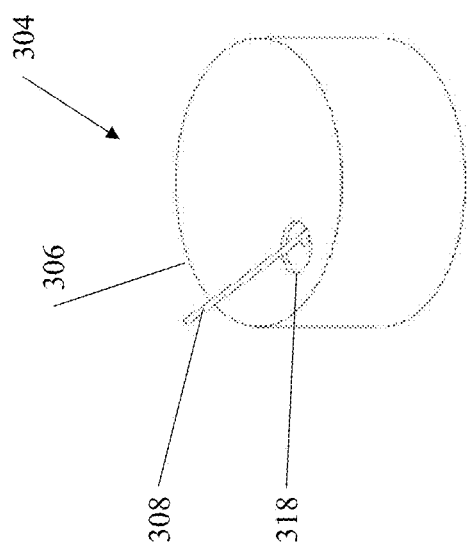

Hybrid Dynamo-FZU Event Detection and Power Generator—No Stored Mechanical Energy A first embodiment of the dynamo-type event detection and power generator 304 is shown in FIGS. 12a and 12b. In this generator 304, a power spring (see FIG. 13) is not preloaded, i.e., there is no mechanical energy stored in the generator 304 prior to activation of the generator 304 resulting from release of the weapon having such generator 304 from an aircraft frame.

FIG. 12a illustrates an assembled dynamo-type event detection and power generator 304, while FIG. 12b illustrates the same with its housing 306 removed. An activating cable 308 and cable stop 310 are contained within a channel 312 in an input disc 314 which is attached to an input ring gear 316, and both are free to rotate. As the cable 308 is pulled (such as by being attached to an air frame and the weapon having such generator 304 being released from the air frame), the input disc 314 and input ring gear 316 will rotate until the system rotates through 180 degrees (the length of the channel 312) at which point the cable stop 310 moves beneath a cable exit hole 318 in the housing 306. At this point, the cable stop 310 is pulled out of its channel 312, thereby freeing the power spring (see FIG. 13) to begin to rotate a flywheel and generator, as described below.

Figure 13:
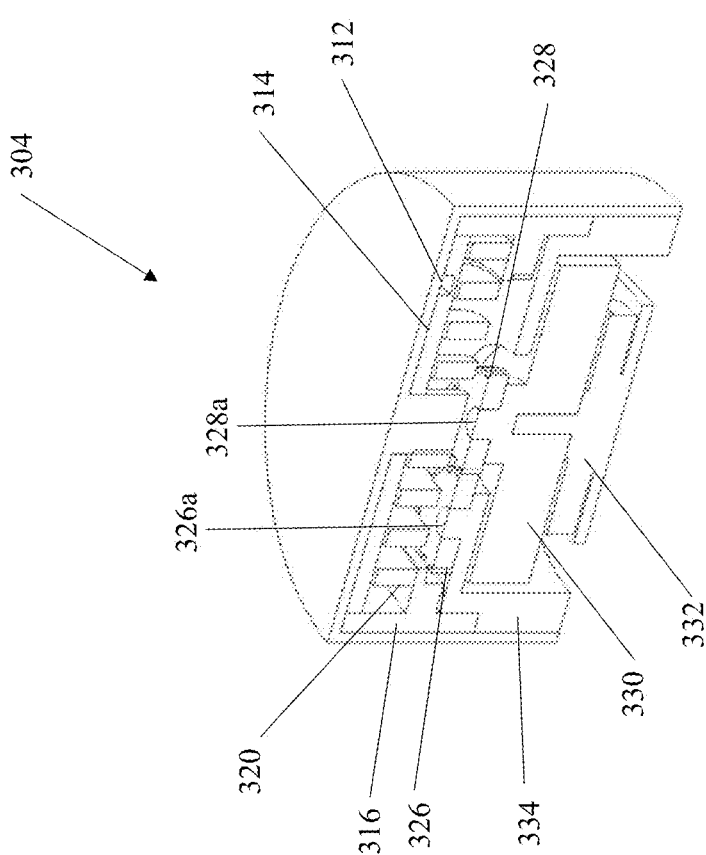
FIG. 13 illustrates internal components of the cable-pull power spring wounding and release gear train mechanism of FIG. 12.
Figure 14:
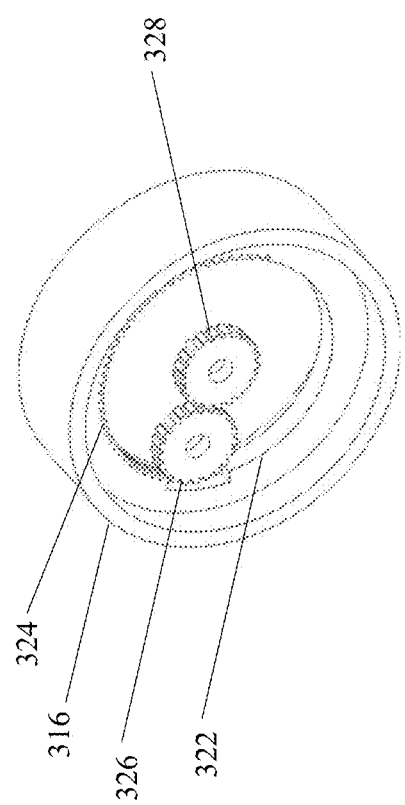
FIG. 14 illustrates the gear train mechanism of the cable-pull power spring wounding and release mechanism.

Referring now to FIG. 13, therein is illustrated internal components of the generator 304 shown in FIGS. 12 and 12b. The generator 304, as illustrated in FIG. 13, shows what transpires during the input pull of the cable 308. An inner end or tang of the power spring 320 is fixed to the generator housing 306, and an outer end or tang of the power spring 320 is connected to the input ring gear 316. When the cable 308 is pulled, mechanical potential energy is stored in the spiral power spring 320. When the cable stop 310 is pulled out of its channel 312 and up through the hole 318 in the housing (FIG. 12a), the power spring 320 unwinds, rotating the input disc 314 and input ring gear 316. As shown in FIGS. 13 and 14, the input ring gear 316 has a freewheel gap 322, namely a gap in the internal teeth 324 of the input ring gear 316 such that at a particular angular position, idler 326 and generator input 328 gears are free to rotate separately from the rest of the system. This gap 322 is positioned at the unwound orientation of the power spring 320 such that after the power spring 320 has unwound, passing all of its potential energy to a flywheel 330 and generator 332, the "generator side" of the system is free to rotate allowing many revolutions of the flywheel 330 and generator 332 beyond the half-turn input of the power spring 320. An idler and input ring support 334 is provided for rotatably mounting the idler and generator input gears 326, 328 on corresponding shafts 326a, 328a, respectively.

Figure 15:
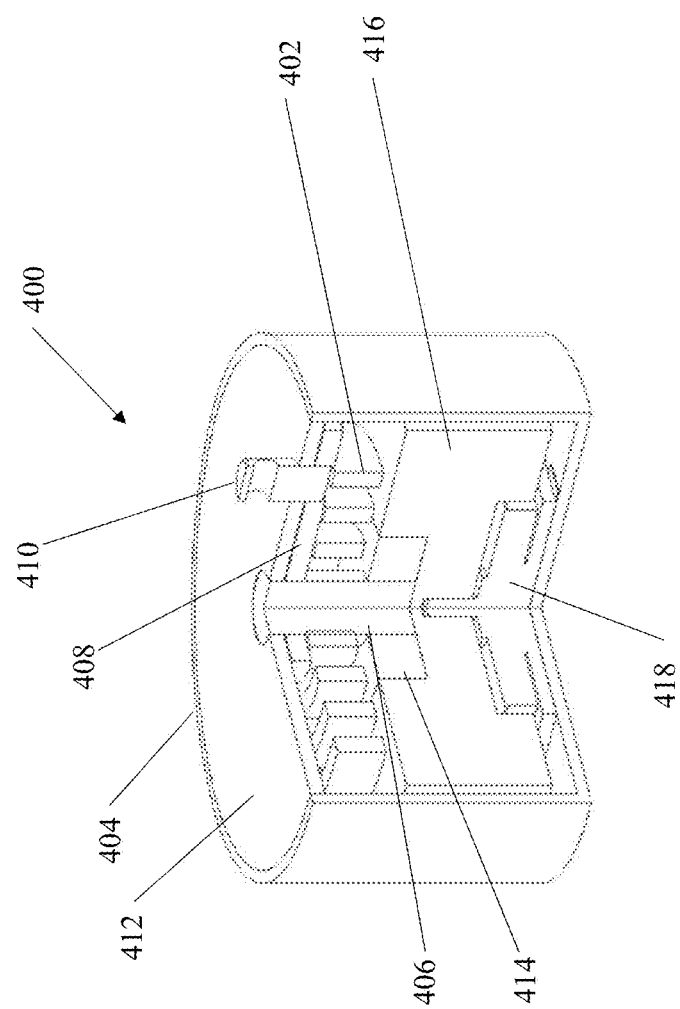
FIG. 15 illustrates internal components of another miniaturized dynamo-type event detection and power generator design for hybrid integration.

Hybrid Dynamo-FZU Event Detection and Power Generator—With Preloaded Power Spring A second embodiment of a dynamo-type event detection and power generator 400 is shown in the cut-away view of FIG. 15. The generator 400 differs from the generator of FIGS. 12a-14 in that in FIG. 15, the power spring 402 is initially preloaded with stored mechanical energy. In the generator 400 of FIG. 15, an outer end or tang of the power spring 402 is anchored to a housing 404 with an inner end or tang being fixed within a rotatable arbor 406. During manufacture/assembly, the power spring 402 is wound, storing mechanical potential energy, and the arbor 406 is immobilized through a release arm 408 and release pin 410 protruding from a top cap 412 of the housing 404. When the release pin 410 is removed/disengaged, the release arm 408 and arbor 406 are no longer constrained against rotation and the power spring 402 begins to unwind, rotating the release arm 408 and arbor 406. The rotating arbor 406 drives an inner race of an over-run clutch 414, which in turn drives a flywheel 416 and generator 418. Once the power spring 402 has completely unwound (mechanical potential energy of power spring passed into kinetic energy of rotating flywheel and generator), the over-run clutch 414 will allow the flywheel 416 and generator 418 to continue rotating, allowing the generator 418 to extract more energy from the system beyond the initial rotation given by the power spring 402.

EXAMPLE 1

The first embodiment generator, FIGS. 12a-14, constructed with a power spring that is not pre-wound with an available (not optimized) power spring that is wound 130 degrees with the pulling of the indicated cable as the FZU is deployed following weapon release, around 300 mJ of mechanical energy is stored in the power spring. Considering a mechanical to electrical energy conversion efficiency of around 40% that was obtained from testing should result in a net available electrical energy of around 120 mJ becoming available to power fuzing electronics and for capacitor storage. Optimizing the power spring of the generator should result in an increase in the available electrical energy to over 150 mJ. This optimization would mostly be accomplished by varying the thickness of the spring to enable the torsion spring to be wound close to 180 degrees.

EXAMPLE 2

The second embodiment generator, FIG. 15, constructed with a power spring that is pre-wound which allows the use of thinner spring material and its winding of more than a full turn, thereby storing a significantly larger amount of mechanical energy in the power spring. As a result, the amount of available energy becomes significantly larger and is expected to nearly double due to more than doubling of its winding turn. Thereby, with the same mechanical to electrical efficiency of 40%, the available energy is expected to become around 240 mJ. Another advantage of this design option is that it is significantly simpler in design, has fewer parts, and is expected to be less costly.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A generator comprising:
   a housing having an opening;
   a rotatable member having a slot formed for an angular length less than 360 degrees;
   a cable disposed in the slot and having a free end protruding from the opening in the housing;
   a cable stop disposed in a predetermined position in the slot;
   a spring for storing energy as the cable is unwound from the slot by pulling on the free end until the rotatable member rotates relative to the housing and the cable stop aligns with the opening; and
   an electromagnetic generator operatively connected to the spring such that the stored energy of the spring is transferred to an input side of the electromagnetic generator.

2. The generator of claim 1, further comprising:
   an input gear connected to an end of the spring, such that the input gear rotates from the stored energy of the spring; and
   a generator gear operatively engaged with the electromagnetic generator and the input gear.

3. The generator of claim 2, further comprising a flywheel operatively connected between the generator gear and the electromagnetic generator.

4. The generator of claim 3, further comprising an idler gear engaged with the generator gear and partially engaged with the input gear such that the input gear loses engagement with the generator gear after a predetermined amount of revolution of the idler gear.

5. A generator comprising:
   a housing having an opening;
   a rotatable member disposed in the housing;
   a release member having an end exposed through the opening and an other end selectively engaging the rotatable member;
   a spring having a pre-stored energy which is released to rotate the rotatable member upon disengagement of the other end with the rotatable member; and an electromagnetic generator operatively connected to the rotatable member such that the rotation of the rotatable member is transferred to an input side of the electromagnetic generator.

6. The generator of claim 5, further comprising a shaft rotatable with the rotatable member.

7. The generator of claim 6, further comprising a clutch having an input side connected to the shaft and an output side connected to the electromagnetic generator.

8. The generator of claim 7, further comprising a flywheel connected between the clutch and the electromagnetic generator.

\* \* \* \* \*